United States Patent [19]
Hilker

[11] 3,805,138
[45] Apr. 16, 1974

[54] STEPPING MOTOR DRIVE ACCELERATION, DECELERATION CONTROL

[76] Inventor: Harry V. Hilker, 1118 Pescando Dr., Newport Beach, Calif. 92660

[22] Filed: Jan. 24, 1973

[21] Appl. No.: 326,446

[52] U.S. Cl............... 318/696, 318/601, 318/603, 318/685
[51] Int. Cl. .......................................... H02k 37/00
[58] Field of Search .......... 318/696, 685, 600, 601, 318/603, 254

[56] References Cited
UNITED STATES PATENTS
| | | | |
|---|---|---|---|
| 3,582,751 | 6/1971 | Rosshirt | 318/696 |
| 3,374,410 | 3/1968 | Cronquist et al. | 318/254 |
| 3,523,230 | 8/1970 | York | 318/685 |

Primary Examiner—G. R. Simmons
Attorney, Agent, or Firm—Lindenberg, Freilich & Wasserman

[57] ABSTRACT

An energizing circuit for providing pulses to a stepping motor, which accelerates and decelerates the stepping motor at a closely controlled rate, including a digital differential analyzer (DDA) and a starting circuit that connects the accumulator of the DDA to the stepping motor and simultaneously connects a pulse generator to the register of the DDA so that the pulse rate to the stepping motor immediately increases at a constant rate. The register has a limited maximum count which determines the maximum pulse rate to the stepping motor. A counter that counts pulses to the stepping motor delivers a signal when the count is less than the final count by a predetermined amount, to disconnect the first pulse generator and connect another pulse generator that decreases the count in the register, to thereby decelerate the stepping motor at a controlled rate.

8 Claims, 4 Drawing Figures

STEPPING MOTOR DRIVE ACCELERATION, DECELERATION CONTROL

BACKGROUND OF THE INVENTION

This invention relates to stepping motors and more particularly to circuits for providing pulses to energize stepping motors.

Stepping motors are widely used to accurately position tables and machining tools. The motors can be driven at a high steady-state or slewing rate, but they must be carefully accelerated to the slewing rate and carefully decelerated therefrom in order to assure that they will advance a step for every input pulse. For example, a motor which can be energized at 5,000 pulses per second (pps) at steady state may have to be initially energized at a rate of no more than 300 pps when accelerated from rest, and may be capable of accelerating a given load at only a predetermined rate such as at an increase of 12 pps per millisecond. One type of drive circuit that has been used employs a voltage controlled oscillator that is varied between limits such as 300 and 5,000 Hz or pps. The voltage controlled oscillator (VCO) utilizes analog devices such as capacitors and resistors, some whose values are continually changed to change the output frequency. The rate at which the frequency is swept through its range is not easily controlled with high accuracy in such analog generators. Accordingly, the VCO or other generator is normally swept through its frequency range by a control circuit that is set to limit the rate of frequency increase or acceleration. The rate of frequency increase, or acceleration, achieved with such a control is normally not known precisely, but is merely set so that the maximum rate never exceeds the prescribed limit for the stepping motor and load combination. Such a control frequently provides an acceleration rate that decreases as the maximum pulse rate is approached. This means that it requires more time for the stepping motor to move a given distance than could be achieved if the motor were driven at its maximum capacity at all times. In many cases, stepping motors are known to be capable of following a predetermined acceleration rate for a given load, and if the driving circuit could always maintain that rate then a minimum of time would be lost in moving a table or tool between two positions.

SUMMARY OF THE INVENTION

In accordance with one embodiment of the present invention, a stepping motor drive circuit is provided which generates pulses at a rate that is closely controlled and which varies in a closely controlled manner. The circuit includes a digital differential analyzer (DDA) which includes an adder, a register that delivers the count therein to the adder, and an accumulator which delivers the count therein to the adder and whose count is repeatedly changed to equal the output of the adder. The accumulator holds only a predetermined maximum count, and the overflows are delivered to a stepping motor assembly to drive it. The register carries an initial count which determines the initial rate at which overflow or output pulses are delivered from the accumulator or adder to the motor assembly. A pulse generator connected to the register can constantly increase the register count to thereby constantly increase the pulse rate from the overflow output of the accumulator. A starting circuit connects the overflow output of the accumulator to the stepping motor assembly and simultaneously connects the pulse generator to the register, so that pulses to the stepping motor assembly initially begin at a low rate and then accelerate at a constant slope until a predetermined maximum rate is achieved. The maximum pulse rate is fixed by limiting the maximum count in the register.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
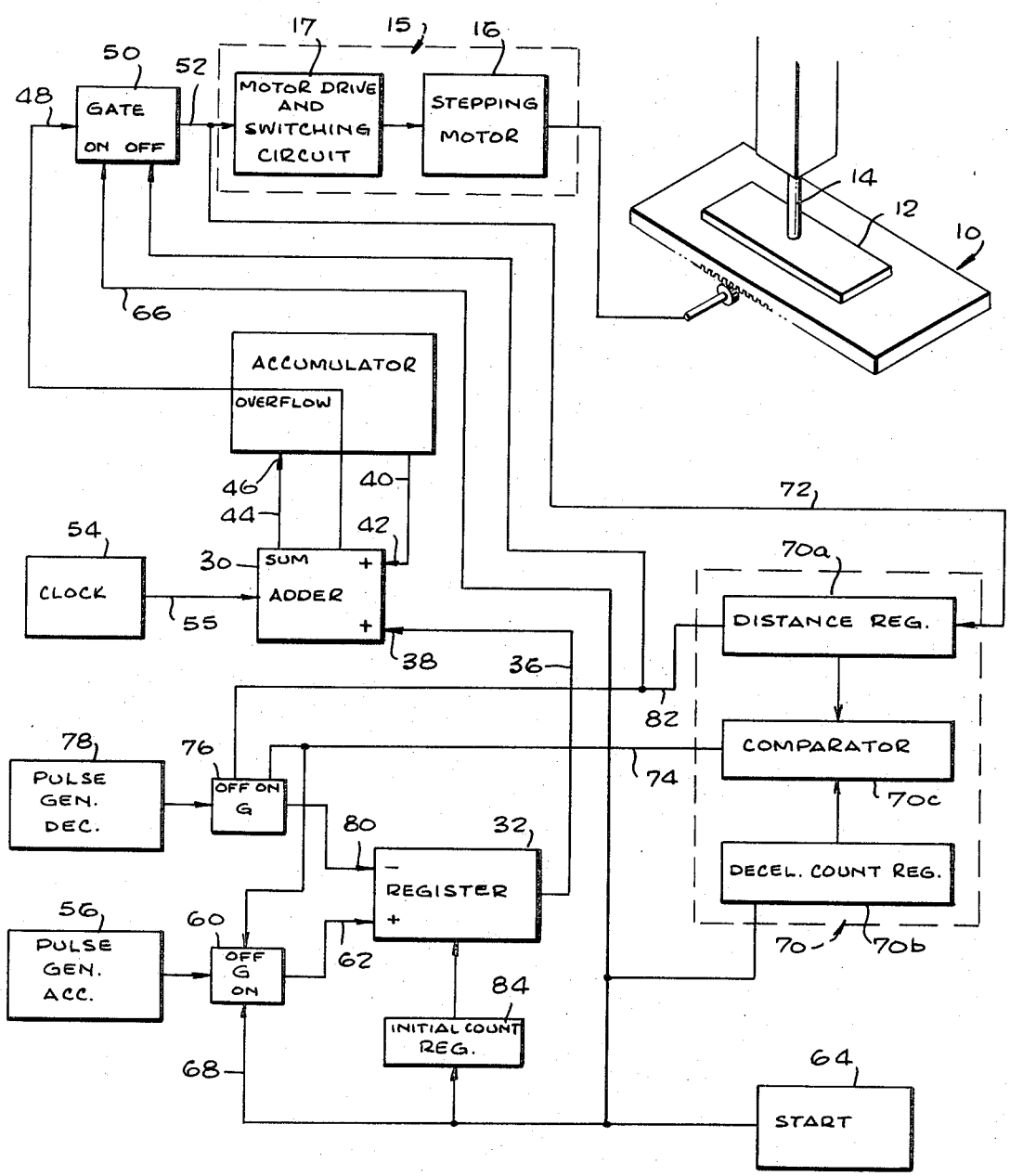
FIG. 1 is a block diagram view of a drive for a machine table.
Figure 2:
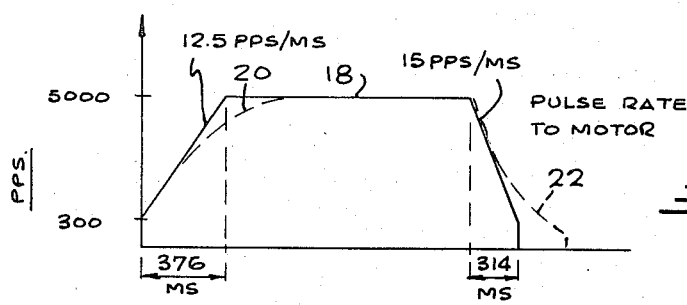
FIG. 2 is a graph showing variations in the pulse rate to the stepping motor of FIG. 1 in a particular circuit constructed in accordance with the invention.

FIG. 1 illustrates a drive for a positioning table 10 of a machine tool to move a workpiece 12 on the table relative to a machine head 14. Such as a type that holds a cutting tool, welding head, or drawing instrument. The drive includes a stepping motor assembly 15 with a motor drive and switching circuit 17 and a stepping motor 16, which can be driven by discrete pulses and which moves a predetermined distance for each pulse. The stepping motor assembly 16 will make one step for each pulse input, provided that the pulses are not delivered at too high a rate. FIG. 2 illustrates in graphical form, the limits of pulse rate input that may be specified for a stepping motor and load combination. The graph 18 of FIG. 2 shows that a maximum pulse rate of 5,000 pulses per second (pps) may be applied to the stepping motor during steady state conditions when the motor is not accelerating or decelerating. However, when the motor is initially at rest and pulses are first applied to begin moving the motor, the pulse rate must not exceed 300 pps. After the motor is started, the pulse rate may be increased up to the maximum level of 5,000 pps, provided that the acceleration of the pulse rate does not exceed 12.5 pps per millisecond. The acceleration limit is necessary due to the additional power required to accelerate the armature of the motor and the mechanism which the motor will drive.

The time required for the stepping motor 16 to move the table 10 a given distance, can be minimized by accelerating the motor at the maximum allowable rate. In FIG. 2, it can be seen that this involves increasing the rate linearly from the starting rate of 300 pps to the steady state rate of 5,000 pps, which can be accomplished in 376 milliseconds. It is also necessary to decelerate the pulse rate as the final position of the motor is reached. In the example of FIG. 2, deceleration is allowable at a rate of up to 15 pps per millisecond between the maximum steady state rate and a level of 300 pps, and the pulses can be immediately stopped once the 300 pps rate is reached. If a device such as a voltage controlled oscillator is utilized to generate the stepping pulses, then the increase may follow the graph portion indicated at 20, wherein the pulse rate is made to accelerate at less than the maximum allowable acceleration rate in order to assure that the acceleration rate of 12.5 pps per millisecond is never exceeded. Similarly, where such analog devices are utilized the deceleration rate is typically varied in a manner indicated at 22, which is often less than the maximum allowable deceleration rate. The circuit of the present invention follows the linear maximum acceleration rate of 12.5 pps per milliseconds and follows the maximum deceleration rate of 15 pps per milliseconds, so that the minimum time is required to move the table between two positions.

The motor driving circuit includes an adder 30, a register 32, and an accumulator 34, which are all arranged to form a device often referred to as a digital differential analyzer (DDA) that is sometimes used in digital circuits. The register 32 holds a variable count which is constantly delivered over line 36 to a first input 38 of the adder. It should be noted that the line 36 generally includes several conductors so that the count in the register is delivered in parallel to the adder; other lines in the drawing may similarly represent groups of conductors. The accumulator 34 holds a variable count which it delivers over its stored-count output 40 to an input 42 of the adder. The adder 30 repeatedly adds the counts received at its two addendum inputs 38, 42 and delivers the resulting sum over a line 44 to an input 46 of the accumulator. The sum delivered to the input 46 of the accumulator is immediately entered in the accumulator to replace the previous number therein. The accumulator 34 is constructed so that it holds only a predetermined count such as 1,000. Actually, a power-of-two capacity closest to 1,000, such as a capacity of 1,023 normally is used. The most significant digit of any count over 1,023 is delivered through an overflow output 48 that can pass through a gate 50 and line 52 to the stepping motor 16 to advance it by a step. Actually, the overflow 48 may be taken directly from the adder output 44, as the carry output therefrom (thhe most significant digit in any count over 1,023).

The register 32 has an initial count in it that it delivers to the adder 30. The adder 30 is controlled by the output from a clock 54, to make an addition of the numbers received at its inputs 38, 42, every time a pulse is received at the clock input 55. If the count in the register 32 is maintained constant, then the pulses received from the overflow output 48 of the accumulator 34 will be at a constant rate, this rate being determined by the initial count in the register 32 and the frequency of clock pulses from the clock 54.

An understanding of the circuit portions described above can be best obtained by considering one example of a circuit which is designed to provide an initial pulse rate of 300 pps. The clock 54 is constructed to deliver a pulse rate of 50k pps, so that the adder 30 makes a new addition at this rate. The register 32 is provided with an initial count of 6. The accumulator 34 is constructed with a maximum capacity of 1,023. At the first pulse from the clock 54, the adder 30 adds the input 38 from the register (which is 6) to the input 42 from the accumulator (which is 0), so that the first sum delivered to the accumulator 34 is six. At the next pulse from the clock 54, the adder 30 adds the input of six from the register to the count of six in the accumulator, so that it delivers a count of twelve to the accumulator.

At each subsequent clock pulse, the count in the accumulator 34 increases by six, until the adder delivers a count of 1,026. The accumulator can hold only a count of 1,023 so that it retains only a count of two, and delivers the overflow as a pulse from its output 48 to the stepping motor. At the next pulse from the clock, the count of two from the accumulator is added to the count of six from the register, so that a count of eight is applied to the accumulator. The count in the accumulator continues to increase by six at each clock pulse until the next overflow is reached, when a next pulse is delivered from the overflow output 48 to the stepping motor. It requires approximately one hundred-seventy clock pulses to provide each overflow pulse from the accumulator, and since the clock runs at 50k pps, overflow pulses are generated at a rate of approximately 300 pps.

The pulse rate is increased by connecting an acceleration-determining pulse generator 56 through a gate 60 to a plus input 62 of the register 32, to increase the count in the register from the initial level such as an initial count of six. In order to follow the acceleration rate of 12.5 pps per millisecond indicated in the graph of FIG. 2, the pulse generator 56 is set to deliver pulses at a rate of 250 pps. This means that at every one two-hundred-fiftieth of a second or every 4 milliseconds, the count in the register 32 is increased by 1, which results in an increase in the pulse rate from the accumulator output 48 by 50 pps. An increase of 50 pps per 4 milliseconds is of the same magnitude as an increase of 12.5 pps per milliseconds, which is the maximum acceleration allowable for the motor. After 376 milliseconds, there will have occurred 94 periods when the rate increased by 50 pps, so that a total increase of 4,700 pps will have occured and a rate of 5,000 pps will be reached. In order to prevent any increase past 5,000 pps, the register 32 is constructed so that it cannot hold a count of more than 100. Thus, the generator 56 can be connected indefinitely to the register 32 without increasing the pulse rate from the accumulator above 5,000 pps.

The pulse rate and acceleration of pulse rate can be calculated in a simple manner. The pulse rate from the accumulator output 48 is equal to the count in the register 32 times the clock rate from the clock 54 and divided by the capacity of the accumulator 34. Thus, for an initial register count of 6, a clock rate of 50k and an accumulator capacity of 1,000, the initial pulse rate is 300 pps which equals 6 × 50,000 ÷ 1,000. Where the maximum register count is 100, the final output of 5,000 pps equals 100 × 50,000 ÷ 1,000. The acceleration rate of pulses from the accumulator output 48 is equal to the pulse rate from the accelerator pulse generator 56 times the clock rate and divided by the capacity of the accumulator. Thus, the acceleration of 12.5 pps per millisecond (12,500 pps per second) equals 250 × 50,000 ÷ 1,000.

The circuit of FIG. 1 is constructed so that the register 32, adder 30, accumulator 34, clock 54, and pulse generator 56 are all constantly operating when the table 10 is in use. Thus, pulses at a rate of 300 pps constantly are delivered from the accumulator output 48. However, these pulses cannot pass through a gate 50 to the stepping motor 16 until a start circuit 64 is operated. When the start circuit 64 is operated, it delivers a pulse over line 66 to the gate 50 to operate the gate so that pulses from the accumulator output 48 can pass through the gate 50 to the stepping motor 16 to energize it. The output of the start circuit 64 is also delivered over line 68 to the gate 60 that connects the acceleration pulse generator 56 to the plus input 62 of the register. Thus, as soon as pulses are delivered to the starting motor, the count in the register 32 begins increasing so that the pulse rate to the motor constantly increases from an initial rate of 300 pps. After the register count reaches 100 and the pulse rate to the motor therefore reaches 5,000 pps, a steady state condition has been reached. The accelerating pulse generator 56 can continue to be connected to the register 32 without affecting the register.

As the table 10 of the machine approaches the location to which it is being moved, the pulse rate to the stepping motor 16 must decrease so that the stepping motor is able to decelerate under the control of its energizing pulses. A counter 70 is provided which is programmed with a pulse count in a distance register 70a thereof, representing the total number of steps of the motor that are required to move it the entire distance from its previous position to the new position. The input 72 receives pulses that decrease the count in register 70a. The counter 70 also has a deceleration count register 70b which holds a count representing the distance required to perform deceleration, such as a count of 740 to decelerate at 15 pps per millisecond from 5,000 pps to 300 pps. A comparator 70c compares the counts in the two registers 70a, 70b, and when the counts are equal the comparator delivers a pulse over an output line 74 that enters the gate 60 to turn off the gate and which enters another gate 76 to turn it on. In the case of machine movements that are short enough so that the maximum pulse rate of 5,000 pps is not reached at the time deceleration must begin, a corresponding count smaller than 740 is entered into the deceleration register 70b.

The gate 76 connects a deceleration pulse generator 78 to a subtraction input 80 of the register 32. Pulses delivered to the subtraction input 80 decrease the count in the register 32 from the previous level of 100 towards a minimum level of six. As a result, the overflow output 48 of the accumulator 34 will constantly decrease from the steady state level of 5,000 pps towards a minimum rate of 300 pps. The decelerating pulse generator 78 delivers pulses at a rate of 300 pps, so that a deceleration rate of pulses to the motor of 15 pps per millisecond is achieved. Between the time when the counter 70 reaches the lower of two counts and the time 314 milliseconds later when it reaches the final count, the pulse rate to the stepping motor will have decreased to the 300 pps rate. When the final count is reached, the distance register 70a of counter 70 delivers a pulse over another output 82 to the gate 50 to turn it off so that no further pulses are delivered to the stepping motor. The output on line 82 also passes to the gate 76 to turn it off so that no further decelerating pulses are delivered to the register 32. Actually, the gate 76 can be turned off at any time before the start of the next acceleration of the stepping motor. An initial count register 84 holds the count of six and enters this count in the register 32 at the beginning of every cycle. It also should be noted that instead of placing the gate 50 between the accumulator output 48 and the motor, the gate can be placed in series with the register output line 36 or either line 40 or 44 that connects the adder and accumulator.

Figure 3:
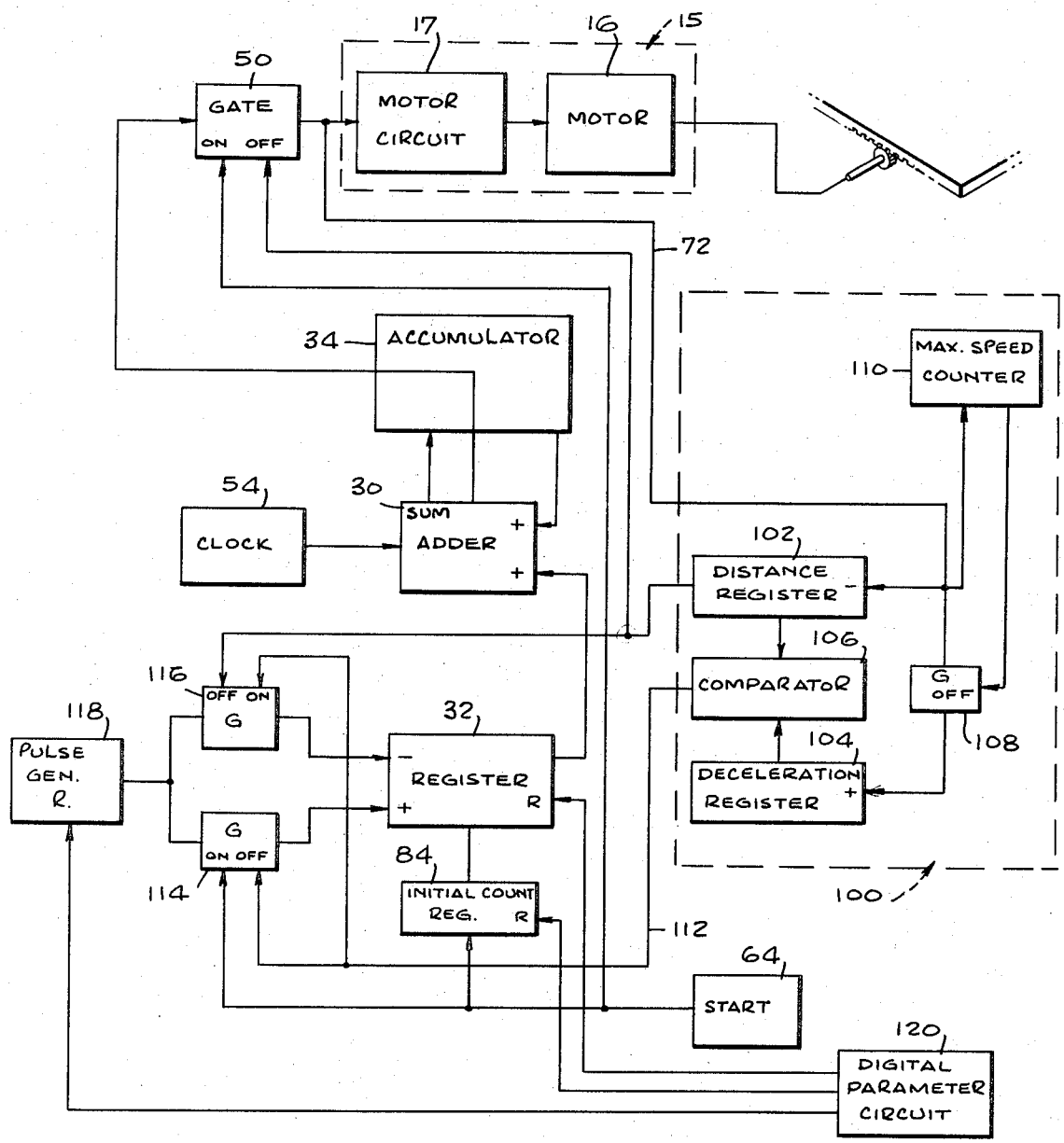
FIG. 3 is a block diagram of a drive constructed in accordance with another embodiment of the invention.

FIG. 3 illustrates a motor driving circuit in accordance with another embodiment of the invention, wherein a simplified counter, or deceleration and stopping circuit, 100 is employed. The circuit 100 decelerates the motor 16 at the same rate as it was accelerated, to thereby simplify the circuit and its setup. The circuit 100 includes a distance register 102 which is similar to the register 70a of FIG. 1, and which is loaded at each cycle of operation with a count representing the movement distance or total number of pulses to be delivered to the stepping motor. The circuit 100 also contains a deceleration register 104 which is reset to zero at the start of each cycle, a comparator 106 that compares the counts in the registers 102 and 104, a gate 108, and a maximum speed counter 110.

When the circuit is started, pulses to the stepping motor assembly 15 also pass through line 72 to the distance register 102 to decrease the count therein. The motor pulses on line 72 also pass through the gate 108 to the deceleration register 104 to increase the count therein from an initial count of zero. When the counts in the two registers are substantially equal, the comparator generates a signal on its output 112 that turns off a gate 114 and turns on a gate 116. The comparator generates a pulse when the counts are equal, but can be instead set to generate a pulse when the count in register 102 becomes less than in register 104. Pulses from a pulse generator 118 then pass through the gate 116 to the register 32 to decrease the count therein and therefore decelerate the pulse rate. The same pulse generator 118 is used for both acceleration and deceleration. The above mode of operation is illustrated by the line 120 in FIG. 4, which is for a cycle in which the total travel distance of the machine is small so that the maximum pulse rate such as 5,000 pps is not reached.

Figure 4:
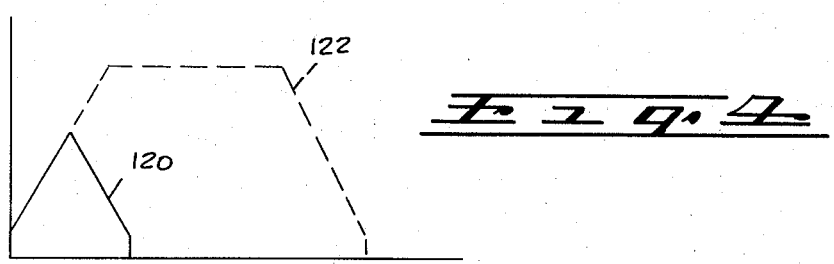
FIG. 4 is a graph showing the manner of operation of the circuit of FIG. 3 during short and long movements of the stepping motor.

In those cycles where the maximum permissible pulse rate is reached, the mode of operation is as indicated by line 122 in FIG. 4. The counter 100 of FIG. 3 accommodates this situation by the provision of the maximum speed counter 110 and the gate 108. The counter 110 counts the number of motor pulses delivered to the stepping motor assembly 15, and after a predetermined number of pulses at which the maximum speed of 5,000 pps is reached (about 880 pulses for a 12.5 pps per ms acceleration rate) the counter 110 delivers a pulse to the gate 108 to prevent any further increase of the count in deceleration register 104. The count in the distance register 102 continues to decrease, and when the count in the distance register equals the count in the deceleration register the comparator 106 will generate a pulse to begin deceleration. The fact that the deceleration rate (12.5 pps per ms) is equal to the acceleration rate and that both occur during the same number of pulses (about 880 pulses), means that the required stopping pulse rate (300 pps) will be reached at the same time as the final desired position of the motor has been reached. To assure that the pulse generator 118 provides enough pulses to decrease the pulse rate to the required level (300 pps), provision can be made to change the phase of the output of the generator 118 so that a pulse occurs immediately after deceleration begins (instead of up to 4 milliseconds later).

The circuit 100 has an advantage that it requires only one pulse generator 118 for acceleration and deceleration and that the only register in circuit 100 that must be set with a different number in each cycle is the distance register 102. The deceleration register 104 and counter 110 are merely reset to zero in each cycle. The disadvantage of the circuit 100 is that a somewhat slower deceleration rate is employed than it is possible to use. However, in many cases the maximum deceleration rate is only slightly larger than the acceleration rate, and the circuit simplification made possible by using the same rates is considerable.

An important feature of the circuit of the invention is that it permits an automatic change of control parameters by a digital control such as a computer, and each of the parameters can be adjusted independently of the others. Thus, for example, if the load changes so that the initial pulse rate may be raised to 400 pps, the acceleration rate may be raised to 15 pps per millisecond, and the maximum rate is 6,000 pps, then the circuit can be readily changed to achieve these rates. This is accomplished by changing the value of the count in the initial count register 84 from 6 to 8, changing the frequency of the pulse generator 56 from 250 pps to 300 pps, and changing the maximum count or capacity of the register 32 from 100 to 120. A parameter changing circuit 120 is connected to resetting inputs R of the register 84, the generator 118, and the register 32. Not only are the parameters easily changeable, but they can be accurately reset to a previous setting. Thus, if the machine operated a particular load in a satisfactory manner for certain circuit parameters, the machine later can be reset to those parameters when the same load is again applied, with a high assurance of satisfactory operation. This may be constrasted with analog circuits wherein repeatability of operation is difficult to achieve, especially if the circuit settings have been changed for other operations and it is attempted to return to the previous settings.

Thus the invention provides a drive for accurately positioning a machine, which includes a stepping motor and a drive circuit which energizes the motor in a closely controlled fashion. The drive circuit generates a digital output with a controlled initial pulse rate, a controlled steady state rate, and a closely controlled rate of change of the pulse rate, so that the motor can be driven at the maximum allowable accurate rate at all times to minimize the period required to move the machine table or other element from one position to the next. The circuit employs a digital differential analyzer, which includes an adder, a register, and an accumulator, to provide pulses to the stepping motor. The register contains a minimum initial count which determines the initial pulse rate. An accelerating pulse generator is connected to the register to increase the count therein at a closely controlled rate which is normally constant to provide a constant acceleration of the motor. The pulse rate from the generator can be made variable to provide an acceleration that varies. In order to prevent a pulse rate to the motor of more than a predetermined level, the register is constructed so that it can be set to hold a desired maximum count which is equal to that required for the maximum steady state pulse rate to the motor, and any additional pulses to the register do not increase the count further.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A stepping motor-powered machine drive comprising:
   a stepping motor assembly;
   a digital adder with a clock input and first and second addendum inputs, for adding the counts at said first and second addendum inputs at times when it receives pulses at the clock input;
   a clock means coupled to said clock input of said adder for providing clock pulses at a predetermined clock rate;
   a digital register for holding a variable count, said register having an output coupled to said first adder input for delivering the register count thereto;
   a digital accumulator for storing a count received at an input thereof, said accumulator input coupled to said adder to receive and store the adder output, said accumulator having a predetermined capacity and having a stored-count output representing the stored count therein coupled to the second adder input, and the machine drive including an overflow output carrying pulses representing the most significant digit of a count which exceeds the accumulator capacity;
   an accelerator-determining generator for generating pulses;
   means for coupling said generator to said register to increase the count therein; and
   means for coupling the overflow output to the stepping motor assembly to energize it.

2. The machine drive described in claim 1 wherein:
   said stepping motor has a predetermined maximum slew pulse rate capability at which it can be reliably driven; and
   said register has a predetermined maximum capacity to limit the maximum pulse rate from the overflow output, said register maximum capacity being equal to the maximum pulse rate capability of the motor times the predetermined accumulator capacity and divided by the clock rate, whereby to limit the pulse rate regardless of how long the accelerator generator is connected to the register.

3. The machine drive described in claim 1 including:
   deceleration means for decreasing the count in said digital register;
   a distance register for holding a count representing the required number of motor pulses to the motor assembly to complete a machine movement;
   a deceleration register for counting pulses;
   means for delivering motor pulses to said distance register to decrease the count therein, and for delivering motor pulses to the deceleration register to increase the count therein;
   a comparator coupled to said distance register and deceleration register for generating a pulse, said comparator coupled to said deceleration means to initiate decreasing of the count in the digital register; and
   means responsive to the motor pulse rate reaching a predetermined maximum level, for operating said delivering means to cease the delivery of motor pulses to the deceleration register while permitting the continued delivery of motor pulses to the distance register;
   said deceleration means decreasing the count in the digital register at the same rate as said accelerator-determining generator increases the count therein, whereby to assure that the pulse rate will decrease to a level at which the motor can reliably stop at the same time as the number of pulses required to complete the machine movement is reached.

4. A stepping motor-powered machine drive comprising:

stepping motor means;

a digital differential analyzer circuit having an adder with first and second addendum inputs and a sum output and having a clock input controlling the times when additions are made, a register with an output connected to said first addendum input, an accumulator having a stored count output connected to said second addendum input and a sum input connected to the sum output of said adder, and an overflow output which carries pulses representing overflow digits of the adder and which is connected to said stepping motor means;

a clock connected to said clock input of said adder;

an accelerator-controlling pulse generator coupled to said register to deliver pulses increasing the count therein; and a starting circuit for initiating the delivery of pulses from said pulse generator to said register to accelerate the stepping motor.

5. The drive described in claim 4 including:

deceleration-controlling pulse means coupled to said register for delivering pulses decreasing the count therein; and counting means responsive to the number of pulses passing from said accumulator overflow output to said stepping motor, for initiating the delivery of pulses from said deceleration-controlling pulse generator to said register.

6. The drive described in claim 4 wherein:

said register holds a predetermined initial count at the beginning of operation of said starting circuit, and said register has a predetermined maximum capacity which is less than the number of pulses deliverable by the accelerator-controlling pulse generator to the register after each operation of the starting circuit, whereby to limit the initial and final pulse rates to the stepping motor.

7. A stepping motor-powered machine drive comprising:

a stepping motor which can reliably follow input pulses thereto at a predetermined maximum initial rate when the motor is initially at rest, at rates that increase at a predetermined maximum acceleration rate, and at a maximum steady state rate;

a digital adder with a pair of addendum inputs, a sum output, and a clock input;

a clock connected to said clock input for delivering pulses at a constant pulse rate thereto;

an accumulator having an input coupled to the sum output of the adder, a stored count output coupled to a first addendum input of the adder, and an overflow output coupled to the stepping motor and carrying pulses representing the overflow digit of any count from the adder exceeding a predetermined accumulator capacity;

a register having a predetermined minimum count therein and a predetermined capacity, said register having an output connected to a second addendum input of the adder and having an input for receiving pulses that increase the count in the register;

a pulse generator for delivering pulses at a predetermined rate coupled to said register input; and a starting circuit for initiating the delivery of pulses from the overflow output of the accumulator to the stepping motor simultaneously with the delivery of pulses from said pulse generator to said register;

said minimum count in said register being equal to said maximum initial rate of said stepping motor times the capacity of said accumulator and divided by the pulse rate of said clock;

said capacity of said register being equal to said maximum steady state rate of said stepping motor times the capacity of said accumulator and divided by the pulse rate of said clock; and said pulse rate of said pulse generator being equal to said maximum acceleration rate of said stepping motor times the capacity of said accumulator and divided by the pulse rate of said clock.

8. In a stepping motor drive which includes a circuit for generating motor pulses at a variable rate, the improvement comprising:

rate changing means for accelerating and decelerating the motor pulse rate from said circuit;

a distance register for holding a count representing the number of motor pulses required to complete a machine movement;

a deceleration register;

count changing means for delivering motor pulses to the distance register to decrease the count thereof and for delivering motor pulses to the deceleration register to increase the count therein;

comparator means coupled to said distance register and deceleration register for operating said rate changing means to begin decelerating the motor pulse rate; and means responsive to the motor pulse rate reaching a predetermined maximum rate, for operating the changing means to stop any further increase in the count of the deceleration register while continuing to deliver pulses to the distance register that decrease the count therein.

* * * * *